Dec. 27, 1932. M. MAIER 1,892,157
FLOWERPOT
Filed May 4, 1931
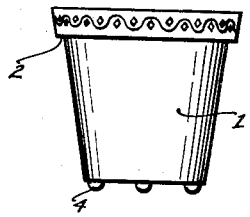
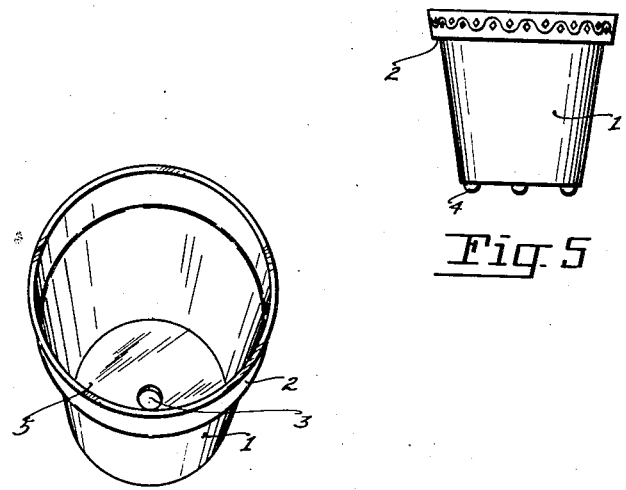
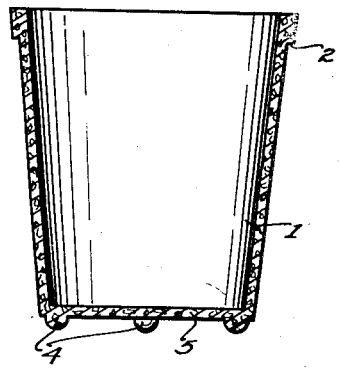
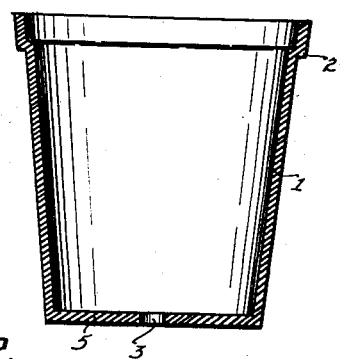
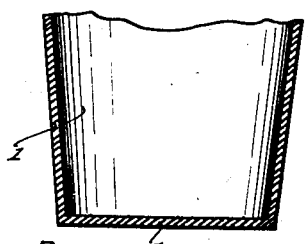
Michael Maier
Inventor
Attorney Patented Dec. 27, 1932

1,892,157

UNITED STATES PATENT OFFICE

MICHAEL MAIER, OF PORTLAND, OREGON, ASSIGNOR OF ONE-THIRD TO LOYAL CLARK AND ONE-THIRD TO ARTHUR C. F. WILKINS, BOTH OF SEATTLE, WASHINGTON

FLOWERPOT

Application filed May 4, 1931. Serial No. 534,902.

My invention is intended as a non-breakable flower pot for use of florists, gardeners, housewives, and others. The device has for its primary object, the placing of a flower pot in the hands of the user that is made of rubber, or rubberized material, or other flexible material that may be used in the manufacturing of flower pots that may be handled and used without the breaking of the pot.

A further object of my invention consists in making a flower pot of a flexible material, as rubber, that is cellular in its construction. The cells are large enough to permit air passing therethrough to aerate the root growth disposed within the pot and yet small enough to prevent the leakage of the water and moisture from the soil content of the pot. Feet are disposed upon the base of the pot to maintain the major portion of the base in spaced relationship with the supporting structure.

A pot thus constructed will prevent moisture forming upon the supporting surface. Suitable colors are placed within the materials to comprise a pot of the desired tint and hue.

One of the objects of my invention is to make a flower pot that will be free from breakage in the normal handling of the same.

A further object of my invention consists in providing a flower pot that will aerate the growing contents of the pot without the leakage of the moisture from the pot through the walls of the pot.

A further object of my invention consists in providing a pot that may be nested for shipment and storage.

Still further objects of my invention consist in so constructing a flower pot that the same may be roughly handled without the breaking of the same.

Still further objects of my invention consist in constructing a flower pot of suitable material that will facilitate an expansion of the pot due to root growth without the breaking of the pots.

With these and incidental objects in view, the invention consists in certain novel features of construction and combination of parts, the essential elements of which are set forth in the appended claims, and a preferred form of embodiment of which is hereinafter shown with reference to the drawing which accompanies this specification.

In the drawing:

Fig. 1 is a perspective top plan view of the pot.

Fig. 2 is a sectional side view of the pot without the use of feet on its supporting side.

Fig. 3 is a fragmentary sectional side view of the base of the pot.

Fig. 4 is a sectional side view of a pot having rubberized feet and the side and bottom walls being made cellular to aerate the growing contents of the pot.

Fig. 5 is a side view of a pot illustrated in Fig. 4.

Like reference characters refer to like parts throughout the several views.

I make the body 1 of my new and improved flower pot of a shape and size similar to that of standard flower pots now in general and common use. I place a reinforcing rim 2 about the upper peripheral edge of the side walls of the pot. Where the flower pot is to be used for the propagating and growing of plants, I form the side and bottom walls of the pot cellular in construction and make the cells of a size that will permit air to flow through the side walls and to aerate the growing contents of the pot. The cellular structure is made small enough to prevent the free leakage of the moisture from within the pot.

Where the pot is to be used in the conservatory, or green house a drain hole 3 is placed centrally through the bottom of the pot, but where growing things are to be kept in a growing condition, and the walls are made cellular, the central hole may be dispensed with. Where the pot is to be used for the displaying of the growing plants, and/or is to be used and placed upon a polished supporting structure, a plurality of feet 4 are placed at the bottom. The feet normally maintain the bottom 5 of the pot in spaced relationship with a supporting surface to permit the aerating of the space disposed between the bottom 5 of the pot and the supporting surface. Suitable coloring matter may be formed and placed within the material during the manufacture of the pot to give the desired tint and hue to the pot structure. The device may be made of live rubber, or rubberized material to prevent the breakage of the pots in the normal use of the same, and to permit a normal and nominal expansion of the body of the pot for the root growth without the destruction of the pot, or root growth.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A flower pot of the class described, comprising a body element made of resilient live rubber and the major portion of the body element being filled with minute voids to aerate growing things being developed within the body element.

2. A flower pot made of resilient live rubber, the walls of the pot being slightly porous, and feet disposed upon the base adapted to support the major portion of the base in spaced relation with a supporting surface.

MICHAEL MAIER.